United States Patent [19]

Satyamurti et al.

[11] Patent Number: 6,078,793
[45] Date of Patent: Jun. 20, 2000

[54] HIGH PRECISION CONTROLLED GAIN VOICE PROCESSING SYSTEM AND METHOD

[75] Inventors: Sunil Satyamurti, Boynton Beach; Thomas Victor D'Amico, Boca Raton, both of Fla.

[73] Assignee: Motorola Inc., Schaumburg, Ill.

[21] Appl. No.: 08/965,301

[22] Filed: Nov. 6, 1997

[51] Int. Cl.[7] .............................. H01Q 11/12; H04B 1/04
[52] U.S. Cl. ........................ 455/116; 455/109; 375/301
[58] Field of Search ..................... 455/116, 126, 455/127, 108, 109, 575, 550; 375/300, 301

[56] References Cited

U.S. PATENT DOCUMENTS

| | | | |
|---|---|---|---|
| 4,726,069 | 2/1988 | Stevenson | 375/301 |
| 4,928,314 | 5/1990 | Grandfield et al. | . |
| 5,115,468 | 5/1992 | Asahi et al. | 375/301 |
| 5,162,763 | 11/1992 | Morris | 375/301 |
| 5,253,270 | 10/1993 | Petit | 375/301 |
| 5,359,607 | 10/1994 | Nguyen et al. | . |
| 5,535,444 | 7/1996 | Grandfield et al. | . |
| 5,564,087 | 10/1996 | Cygan et al. | 455/116 |
| 5,564,092 | 10/1996 | Grandfield et al. | . |
| 5,692,105 | 11/1997 | Leppanen et al. | 455/116 |
| 5,815,532 | 9/1998 | Bhattacharya et al. | 375/301 |

*Primary Examiner*—Edward F. Urban
*Attorney, Agent, or Firm*—James A. Lamb

[57] ABSTRACT

A processing system (150) that generates a voice output signal having high precision controlled gain from a voice input signal by generating (225) a slow gain signal from the voice message by controlling a signal level gain of the voice signal using a setup gain and a first slow time constant, and then generating (230) a high precision controlled gain voice signal from the slow gain signal by controlling a signal level gain of the slow gain signal using at least one of a fast attack time constant and a slow release time constant.

17 Claims, 2 Drawing Sheets

HIGH PRECISION CONTROLLED GAIN VOICE PROCESSING SYSTEM AND METHOD

FIELD OF THE INVENTION

This invention relates in general to automatic gain control technology for voice signals, and in particular to high precision automatic gain control technology for voice signals.

BACKGROUND OF THE INVENTION

A well known technique for improving the reception of single sideband (SSB) amplitude modulated radio signals is to include a pilot carrier within the transmitted radio signal. The pilot carrier allows the receiver to more reliably determine the carrier frequency of the transmitted signal and can also be used to establish a reference magnitude and phase of the transmitted signal. This technique is used, for example, in the InFLEXion™ paging system, which is described in U.S. Pat. No. 5,689,440 entitled "Voice Compression Method and Apparatus in a Communication System" issued to Leitch et al. on Nov. 18, 1997, in which a plurality of independent SSB modulated analog signals (which are typically voice signals) can be simultaneously transmitted. In the InFLEXion™ paging system, the independent SSB analog signals are time compressed and digitally transformed analog signals that are modulated in pairs, each pair being modulated about a pilot carrier. In SSB systems, the ratio of the average power of the signal to the pilot carrier power needs to be maintained at a constant level with very minimal variation so as to achieve good quality transmission and reception. Since it is not difficult to maintain the pilot signal precisely by prior art techniques, maintenance of the ratio is accomplished by acquiring and maintaining a gain of the analog signal during an analog message, such as a voice message. A precision maintenance of this ratio, such as a maximum variation of ±0.5 dB (decibels) during a single voice message, is at least as important in the InFLEXion™ paging system as in other SSB systems, and can improve the quality of the received signal several fold over signals having less well regulated ratios, such as the ratios provided by commonly used standard automatic gain control circuits, which typically vary by at least a couple of dB. Maintaining the ratio is made more complex in a paging system than in some other systems by the fact that the analog signals are voice messages (in contrast, for example, to a system in which only modem signals are transmitted), and they are typically generated by a variety of sources, such as different telephone instruments and other voice transducers, and the fact that received voice signals are subject to large variation in amplitude (>40 dB) due to different connections or path losses in the public telephone network.

Thus, what is needed is an improved technique for precisely controlling the ratio of the signal level of a SSB single sideband signal to a pilot carrier during an analog signal that carries voice messages.

DETAILED DESCRIPTION OF THE PREFERRED EMBODIMENT

Figure 1:
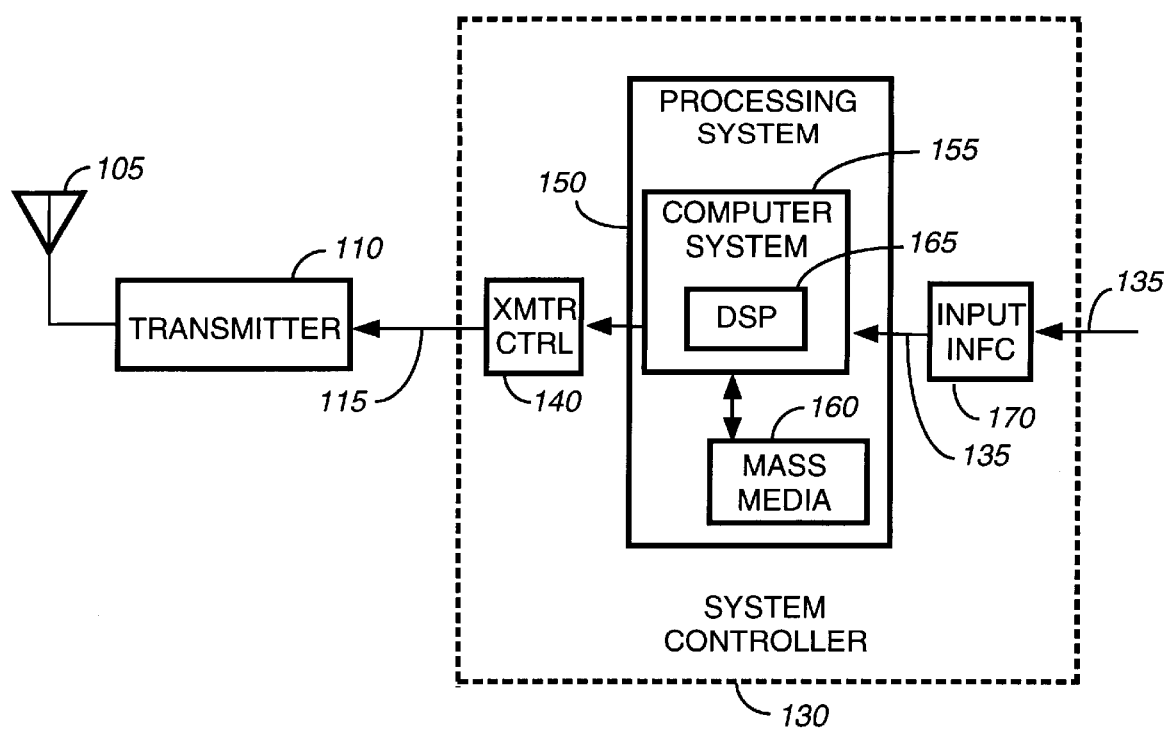
FIG. 1 is an electrical block diagram of a fixed portion of a radio communication system, in accordance with the preferred embodiment of the present invention.

Referring to FIG. 1, an electrical block diagram of a fixed portion 100 of a radio communication system is shown, in accordance with the preferred embodiment of the present invention. The radio communication system is a two way paging system that transmits analog messages that are typically voice messages, to pagers. The fixed portion 100 comprises a system controller 130 and a plurality of radio transmitters, including a radio transmitter 110. The system controller 130 receives digitized and non-digitized analog signals from a variety of sources, such as telephone instruments, radio broadcast music, and computers generating pre-recorded messages, that are typically coupled to the system controller 130 through switched telephone network links. These are generically referred to as voice input signals. One of these voice input signals is digitized analog input signal 135, which is mu law pulse code modulated (PCM) in a conventional manner. The system controller 130, which comprises an input interface (INPUT INFC) 170, a processing system 150, and a transmitter controller (XMTR CTRL) 140, receives the digitized analog input signal 135 at the input interface 170, which terminates links carrying a plurality of analog signals including the digitized analog input signal 135. The input interface 170 couples the digitized analog input signal 135 to the processing system 150. When a voice input signal is an analog signal, the input interface 170 converts it to a mu law PCM signal before coupling it to the processing system 150. The processing system 150 converts the voice input signal from a mu law PCM signal to a linearly digitized audio signal and modifies it by, among other things, controlling the signal level of the digitized analog signal using a unique high precision automatic gain technique described herein with reference to FIG. 2. The resulting signal is referred to herein as a voice output signal. The processing system 150 then further modifies the voice output signal using a conventional time compression technique such as that described in U.S. Pat. No. 5,689,440, issued to Leitch et al. This produces a linear digitized time compressed analog signal referred to herein as a digitized compressed analog signal that comprises digital samples representing the time compresses analog signal at equal time intervals. The processing system 150 couples the digitized compressed analog signal and at least one other, independent digitized compressed analog signal (derived from an input signal in the same manner described above) to the transmitter controller 140, which in this example selects the transmitter 110 to transmit the digitized compressed analog signals. The digitized compressed analog signals are coupled to the transmitter 110 by means of a link 115, which is a conventional analog link comprising, for example, public switched telephone links and microwave links. The transmitter 110 transforms the digitized compressed analog signals to SSB signals and adds a pilot signal to each pair of such transformed signals. A pair of transformed SSB signals with the pilot carrier are used to modulate a radio frequency (RF) signal at a RF subcarrier frequency. The modulated RF signal is amplified by the transmitter 110 and coupled to an antenna 105 for broadcasting.

The processing system 150 comprises a computer system 155 coupled to a mass media 160. The mass media 160 is preferably a conventional hard disk that stores sets of program instructions that control a digital signal processor (DSP) 165 that is a portion of the computer system 155. The DSP 165 is preferably a conventional processor of the DSP56000 family of digital signal processors manufactured by Motorola, Inc. of Schaumburg, ILL. The processing system 150 comprises other conventional devices not shown in FIG. 1, such as a clock reference, I/O drivers, and random access memory. The sets of program instructions comprise unique sets of program instructions which control the DSP 165 to perform the unique functions described in more detail with reference to FIG. 2. The input interface 170, other portions of the processing system 150 not shown in FIG. 1, and the transmitter controller 140 are conventional portions of a model WMG™ system controller manufactured by Motorola, Inc., but the WMG™ is modified to use the DSP56000 processor. The transmitter 110 and the antenna 105 are conventional devices.

It will be appreciated that the sets of program instructions that provide the unique functions described herein could alternatively be stored in other types of memory, such as read only memory (ROM), and that other types of digital signal processors could be used in place of the DSP 165.

Figure 2:
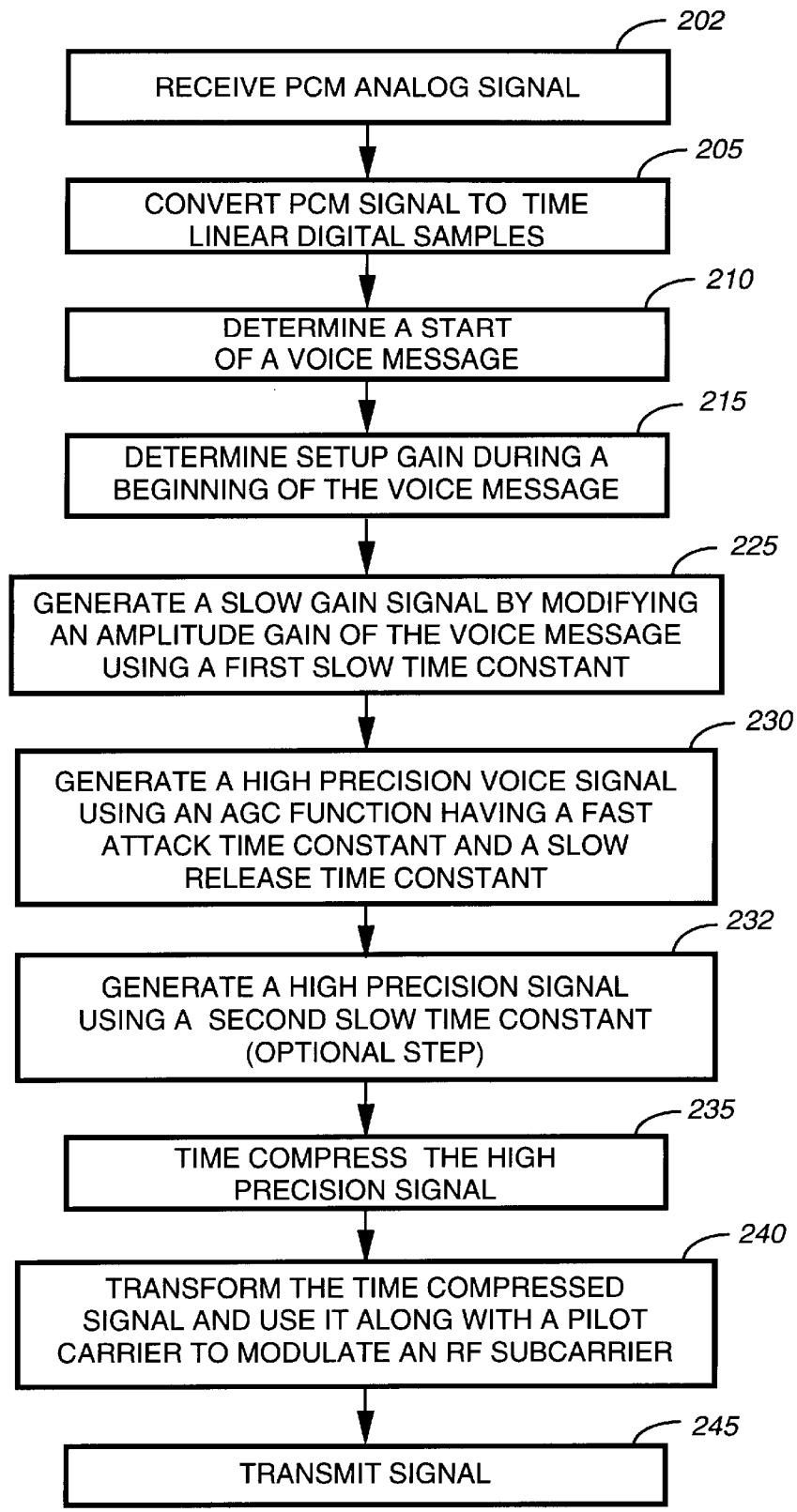
FIG. 2 is a flow chart of a method used in a system controller of the fixed portion of the radio communication system depicted in FIG. 1, for generating an analog output signal having high precision controlled gain from an analog input signal, in accordance with the preferred embodiment of the present invention.

Referring to FIG. 2, a flow chart of a method used in the system controller 130 of the fixed portion 100 of the radio communication system is shown, in accordance with the preferred embodiment of the present invention. The method is for generating a voice output signal having high precision controlled gain from a voice input signal, which in this case is a digitized analog input signal 135. At step 202, the digitized analog input signal 135 is received at the input interface 170 and coupled to the processing system 150. In this example, the digitized analog input signal 135 is a mu law PCM signal. Within the processing system 150, the DSP 165 is controlled by a first set of program instructions to convert the digitized analog input signal 135 at step 205 from a mu law PCM signal to a linear series of digital samples that represent the digitized analog input signal 135. At step 210, the DSP 165 is controlled by a second set of program instructions to determine the start of a voice message included in (i.e., carried by) this linearly digitized version of the voice input signal, using conventional techniques. When the start of a voice message has been identified at step 210, a third set of program instructions controls the DSP 165 to measure an average signal level of the voice message during the beginning of the voice message at step 215. The beginning of the voice message is a predetermined duration at the start of the voice message that is preferably one second, but could alternatively be between 0.250 seconds and the length of the message without substantially changing the benefits provided by the present invention, other than an amount of delay that is caused before the message can be transmitted. The average signal level established at step 215 is used to determine a setup gain. The setup gain is that amount of gain required to adjust the average signal level of the voice message, as established during the beginning of the message, to a level that is 10 dB (decibels) below a maximum input level of a standard automatic gain control function described below with reference to step 230. It will be appreciated that gains described herein can be positive or negative values, which respectively relate to increasing and decreasing the signal level of a signal with respect to a reference, which is the level 10 dB below the maximum input level described this step. It will be appreciated that when a longer time is used, the setup gain will typically more accurately represent a gain that adjusts the average signal level of the signal to exactly 10 dB below the maximum input level. It will be further appreciated that in accordance with a first alternative embodiment of the present invention, a predetermined setup gain can be used instead of determining the setup gain as described above. Use of a predetermined gain is beneficial when avoidance of a transmission delay is important.

The signal level of the linearly digitized version of the voice input signal during the voice message is then modified by the DSP 165 operating under control of a fourth set of program instructions. The modification is by a slow gain modifier function that uses the setup gain determined in step 215 as an initial gain applied to the signal level of the voice input signal and uses a weighted long-term average power estimate of the linearly digitized version of the voice input signal to modify the gain that applies to the signal level of the voice input signal. In accordance with a second alternative embodiment of the present invention, a block processing technique is used, which would also provide a similar benefit of precise gain control, but typically requires more temporary memory storage than the weighted moving average technique. The weighted moving average technique uses a conventional linear filter function having a transfer function of $\beta/(1-\beta Z^{-1})$ and a constraint that the weighted moving average cannot provide any positive gain; only decreases of the signal level of the voice input signal are given effect. This constraint prevents a noise floor of the voice message from increasing. The preferred value for $\beta$, which is referred to herein as the first slow gain time constant, is a value that provides a time constant of 3 seconds, although other times from 2.0 to 5.0 seconds will provide much of the same benefit of precise gain control for typical voice messages. The value of $\beta$ is determined by the value of the first slow gain time constant and the intervals between the digital samples, in a conventional manner. The resulting digitized signal is referred to herein as a slow gain signal.

The DSP 165 is controlled by a fifth set of program instructions at step 230 to generate a digitized analog signal referred to herein as a high precision voice signal by controlling a gain of the signal level of the slow gain signal using an automatic gain control (AGC) function implemented for voice signals that has an attack time of 50 milliseconds to 250 milliseconds, herein also referred to as a fast attack time, and a release time of 0.5 seconds to 2.0 seconds, herein also referred to as a slow release time. Attack time is defined as the time required for the high precision voice signal to settle within 10% of a steady state output signal level in response to a 6 dB instantaneous increase in the signal level of test signal used in place of the slow gain signal that is a 1 kHz tone. Release time is defined as the time required for the high precision voice signal to settle within 10% of a steady state output signal level in response to a 6 dB instantaneous decrease in the signal level of test signal used in place of the slow gain signal that is a 1 kHz tone. The AGC function also clips the modified slow gain signal when its signal level exceeds the maximum input level described above with reference to step 215. The signal resulting from the signal level gain controls described herein at step 230, referred to herein as a high precision digitized voice signal, is further modified by the DSP 165 under control of a sixth set of program instructions which performs a conventional time compression function, resulting in a digitized compressed analog signal that is coupled to the transmitter controller 140, which in this example selects the transmitter 110. The transmitter controller 140 couples the digitized compressed analog signal to the transmitter 110, wherein the digitized compressed analog signal is transformed, combined with a pilot carrier, and used to modulate an RF signal at a RF subcarrier frequency at step 240. The modulated RF carrier is transmitted from the antenna 105 at step 245.

The method described with reference to FIG. 2 provides a high precision voice signal that has an average signal level that is maintained such that the average power of the high precision signal does not vary by more than ±0.5 dB for typical voice signals. When tighter gain control is needed, or when there are atypical signal level variations in voice signals, a second, optional slow gain step can used. This is shown in FIG. 2 as optional step 232, which repeats the function performed at step 225 after step 230, except that the signal level of the voice output signal instead of the voice input signal is modified, the initial condition is unity gain and the time constant used at step 232 is a second slow gain time constant that need not be identical to the first slow gain time constant used at step 225.

It will be appreciated that the processing system described herein will provide benefits for analog signals (whether received initially as digitized or non-digitized signals) that are voice or are voice like (such as music signals). For this reason, the operation described above refers to voice signals, but the term should be understood to include other analog signals.

It will be appreciated that the sets of program instructions described above are not necessarily independent, in that they can comprise common subsets of program instructions. Furthermore, it will be appreciated that the unique advantage of the present invention of precisely controlling the gain of a voice message, and therefore precisely controlling the ratio of the power of the voice message to the power of a pilot signal is provided by the unique combination of the functions and time constants in the order described above, which increases the reliability of the voice message in comparison to prior art systems.

We claim:

1. A processing system that generates a voice output signal having high precision controlled gain from a voice input signal, comprising:
    a digital signal processor; and
    an instruction memory comprising program instructions, wherein the program instructions control the digital signal processor to:
        determine a setup gain from an average signal level of a voice message carried by the voice input signal and measured during a predetermined time at a start of the voice message,
        generate a slow gain signal from the voice message by controlling a gain applied to a signal level of the voice input signal using the setup gain as an initial gain and a first slow time constant to modify the gain, and
        generate the voice output signal having high precision controlled gain from the slow gain signal by controlling a signal level gain of the slow gain signal using at least one of a fast attack time constant and a slow release time constant, wherein the fast attack time constant is faster than the first slow time constant.

2. The processing system according to claim 1, wherein the predetermined time is at least two hundred fifty milliseconds.

3. The processing system according to claim 1, wherein the instruction memory comprises program instructions that control the digital signal processor to generate the slow gain signal with a unidirectional signal level gain adjustment.

4. The processing system according to claim 3, wherein the unidirectional signal level gain adjustment adjusts a signal level gain of the slow gain signal only down.

5. The processing system according to claim 1, wherein the first slow time constant is at least two seconds, and wherein the fast attack time constant is in a range of fifty milliseconds to two hundred fifty milliseconds and the slow release time constant is in a range of one-half to two seconds.

6. The processing system according to claim 1, wherein the program instructions further control the digital signal processor to detect the start of the voice message.

7. The processing system according to claim 1, wherein the program instructions further control the digital signal processor to modify the high voice output signal by controlling a signal level gain of the voice output signal using a second slow time constant.

8. The processing system according to claim 1, wherein the gain applied to the signal level of the voice input signal is controlled by a filter function having a transfer function of the form $\beta/(1-\beta Z^{-1})$.

9. A method for generating a voice output signal having high precision controlled gain from an input signal, comprising the steps of:
    determining a setup gain from an average signal level of a voice message carried by the voice input signal and measured during a predetermined time at a start of the voice message;
    generating a slow gain signal from the voice message by controlling a gain applied to a signal level of the voice input signal using the setup gain as an initial gain and a first slow time constant to modify the gain; and
    generating the voice output signal having a high precision controlled gain from the slow gain signal by controlling a signal level gain of the slow gain signal using at least one of a fast attack time constant and a slow release time constant, wherein the fast attack time constant is faster than the first slow time constant.

10. The method according to claim 9, wherein the predetermined time is at least two hundred fifty milliseconds.

11. The method according to claim 9, wherein the slow gain signal is generated with a unidirectional signal level gain adjustment.

12. The method according to claim 11, wherein the unidirectional signal level gain adjustment adjusts a signal level gain of the slow gain signal only down.

13. The method according to claim 9, wherein the first slow time constant is at least two seconds, and wherein the fast attack time constant is in a range of fifty milliseconds to two hundred fifty milliseconds and the slow release time constant is in a range of one-half to two seconds.

14. The method according to claim 9, further comprising a step of detecting the start of the voice message.

15. The method according to claim 9, further comprising a step of modifying the voice output signal by controlling a signal level gain of the voice output signal using a second slow time constant.

16. The method according to claim 9, wherein the gain applied to the signal level of the voice input signal is controlled by a filter function having a transfer function of the form $\beta/(1-\beta Z^{-1})$.

17. A processing system that generates a voice output signal having high precision controlled gain from a voice input signal, comprising:
    a digital signal processor; and
    an instruction memory comprising program instructions, wherein the program instructions control the digital signal processor to:

generate a slow gain signal from the voice message by controlling a gain applied to a signal level of the voice input signal using a predetermined setup gain as an initial gain and a first slow time constant to modify the gain, and generate the voice output signal having high precision controlled gain from the slow gain signal by controlling a signal level gain of the slow gain signal using at least one of a fast attack time constant and a slow release time constant, wherein the fast attack time constant is faster than the first slow time constant.

* * * * *